Oct. 14, 1958   M. I. DUMSHA   2,856,194
GROCERY CART WITH CHILD'S SEAT
Filed April 18, 1958   4 Sheets-Sheet 1

INVENTOR.
Michael I. Dumsha
BY
Irving Seidman
ATTORNEY

INVENTOR.
Michael I. Dumsha
BY
Irving Seidman
ATTORNEY

Oct. 14, 1958  M. I. DUMSHA  2,856,194
GROCERY CART WITH CHILD'S SEAT
Filed April 18, 1958  4 Sheets-Sheet 3

INVENTOR.
Michael I. Dumsha
BY
Irving Seidman
ATTORNEY

Oct. 14, 1958     M. I. DUMSHA     2,856,194
GROCERY CART WITH CHILD'S SEAT

Filed April 18, 1958     4 Sheets-Sheet 4

INVENTOR.
Michael I. Dumsha
BY
Irving Seidman
ATTORNEY

United States Patent Office 2,856,194
Patented Oct. 14, 1958

2,856,194

GROCERY CART WITH CHILD'S SEAT

Michael I. Dumsha, Philadelphia, Pa.

Application April 18, 1958, Serial No. 729,347

15 Claims. (Cl. 280—33.99)

This invention relates to grocery carts of the nesting type; and more particularly concerns such carts which include collapsible seat means for seating a child in the rear portion of the cart.

An object of this invention is to provide a grocery cart of the character described which includes an open top grocery container having a swingable back wall to allow for the nested relation of successive, similar carts; and improved means for guiding a collapsible seat within the container as the same moves to its collapsed position when said carts are nested together.

Another object of this invention is to provide in a grocery cart of the character described, fixed guide means on a frame portion of the cart, which facilitates the movement of the collapsible seat and associated seat supporting means upon hinged movement of the back wall of the container as the carts are nested together.

A further object of this invention is to provide in a cart of the character described, wherein a back wall and an associated collapsible seat and seat supporting means are swingable towards a substantially horizontal position when the carts are nested together, improved guide means for directing such swinging movement, together with stop means for limiting such movement so as to avoid inadvertent, continued swinging movement thereof towards the handle of the cart and possible injury to one nesting the carts.

Still another object of this invention is to provide in nestable grocery carts having hinged back walls and associated collapsible seat and seat supporting means, improved guide means for directing the movement of the seat between operative and collapsed positions thereof, the guide means being fixed on the frame of the cart, thereby eliminating any possible binding action as the seat moves relative to the guide means.

Yet another object of this invention is to provide an improved grocery cart construction of the nestable type, which includes guide means having a minimum number of component parts and which is of a structure such as to facilitate the fabrication of the cart as a whole.

Other objects of this invention will in part be obvious and in part hereinafter pointed out.

In the drawings, Fig. 1 is a side elevational view of a grocery cart embodying the invention;

Figure 1:
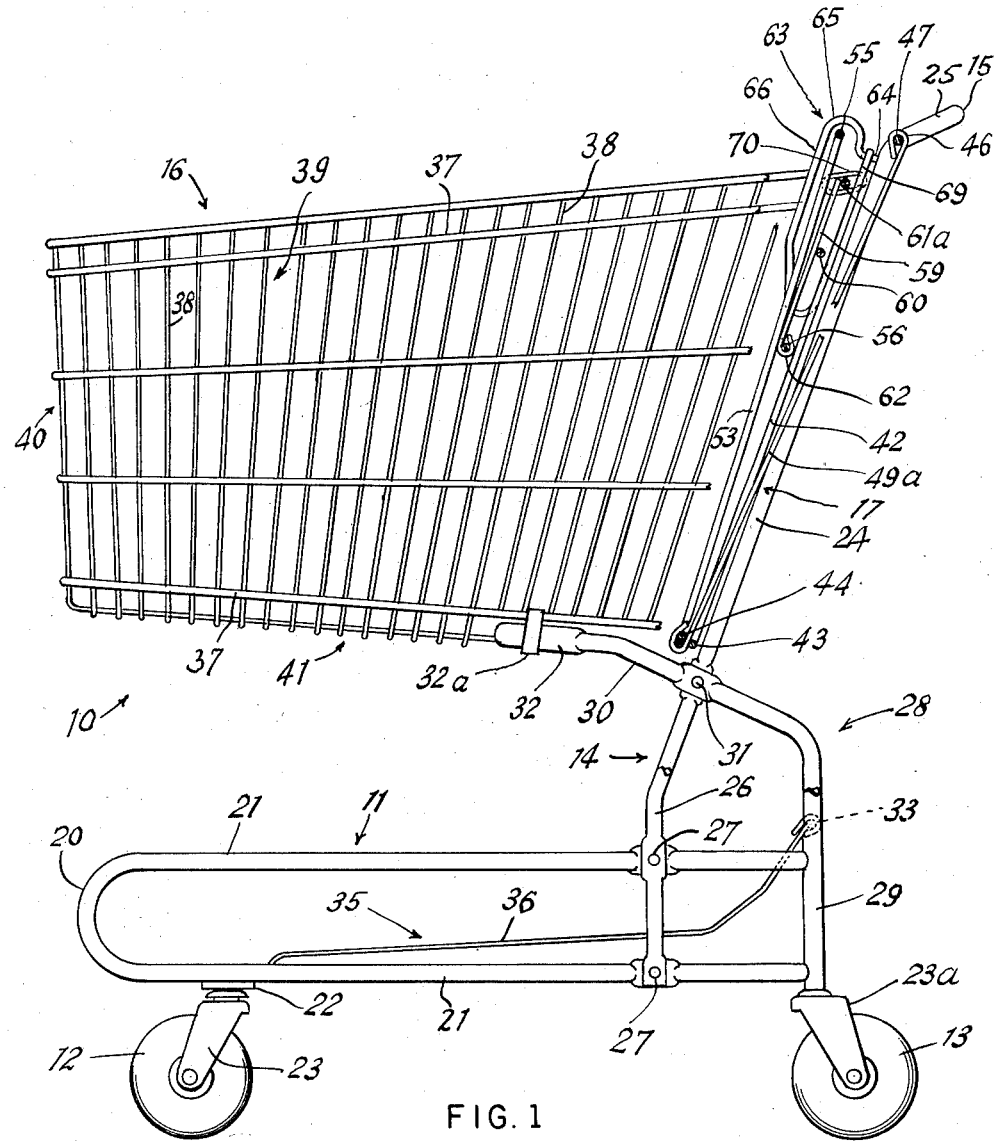

Referring in detail to the drawings, 10 designates a grocery cart of the nesting type and embodying the invention. The same comprises essentially an undercarriage 11 provided with front wheels 12 and rear wheels 13; frame means 14 upstanding from a rear portion of undercarriage 11, said frame means including a horizontal handle 15 at the upper end thereof; and an open type basket 16 mounted on frame means 14 and extending forwardly over carriage 11.

Figure 3:
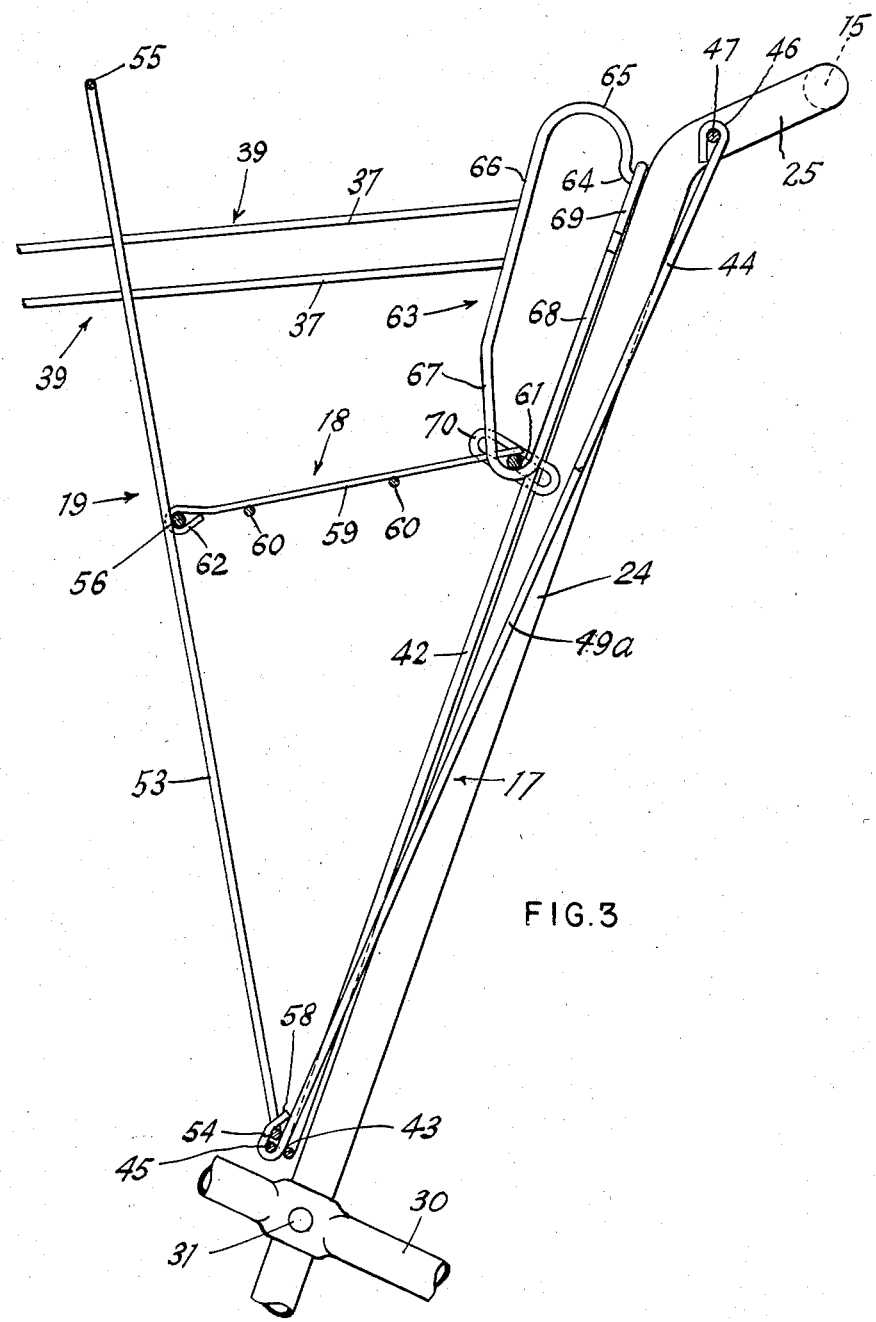
Fig. 3 is a detailed side elevational view showing the seat in its operative position.
Figure 4:
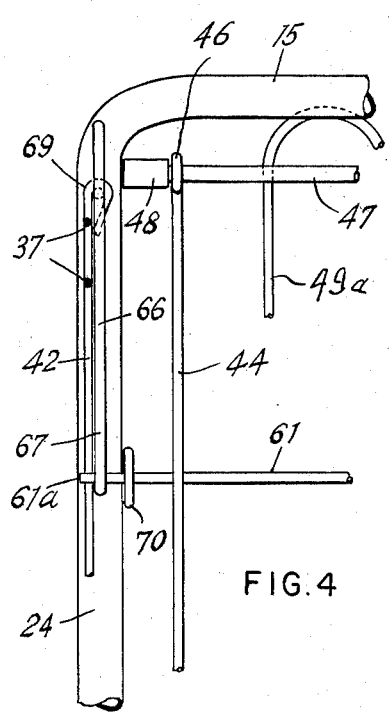
Fig. 4 is a partial, detailed end elevational view of the back wall member of the cart and the associated guide means.
Figure 5:
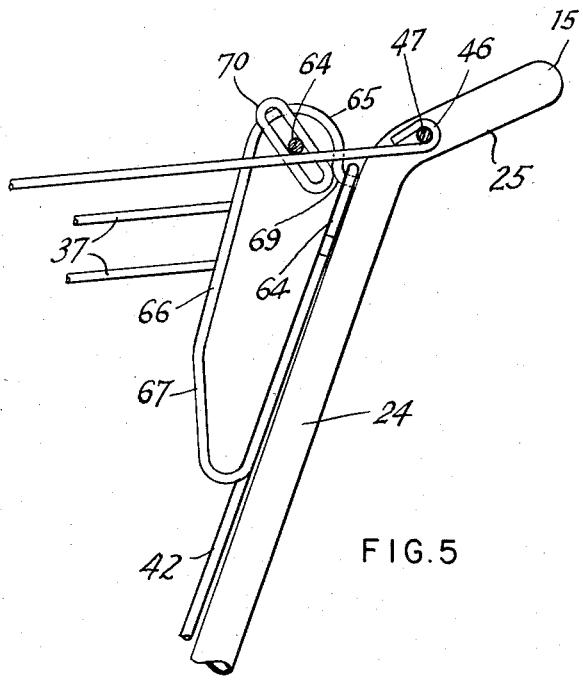
Fig. 5 is a partial, detailed side elevational view thereof.

Basket 16 includes a back wall member 17 hingedly mounted at its top edge on frame 14 for swinging movement forwardly of the basket 16 in a clockwise direction, as shown in Fig. 3, from its normal, generally vertical position, to a horizontal position, to admit the forward end portion of a similar cart, to nest the same.

Within basket 16 is located a seat generally indicated at 18 which is of the collapsible type, being adapted to move between a horizontal position and a vertical collapsed position wherein it is disposed adjacent back wall member 17. Seat 18 is retained in its horizontal position by a combination support and back member, generally indicated at 19; said member 19 being hingedly connected at its lower end to back wall member 17 for movement towards and away from said member 17; said member 19 being movable together with back wall member 17 when the latter moves to its horizontal position, the seat 18 being carried in a collapsed condition between members 17 and 19.

Undercarriage 11 comprises essentially a pair of bent U shaped tubular side members 20 having parallel arm portions 21 horizontally disposed in vertical planes; the side members 20 being in opposed, forwardly converging relation. Side members 20 are connected at their forward ends by a cross member 22 welded to the undersides of lower arm portions 21 and carrying castors 23 on which front wheels 12 are mounted.

Side members 20 are further interconnected by frame means 14. Said frame means comprises a tubular member in generally inverted U shaped form, including parallel, intermediate arm portions 24 which extend upwardly and rearwardly; rearwardly offset, short arm portions 25 at the upper ends of arm portions 24, said arm portions 25 being connected by horizontal handle 15; and vertical arm portions 26 extending downwardly from the lower ends of arm portions 24.

The vertical arm portions 26 of frame means 14 are secured to arm portions 21 of side members 20 at points 27 inwardly of the ends of arm portions 21. Frame means 14 is supplemented by angle members 28 having vertical arms 29 secured to the outer ends of arm portions 21 of side members 20 and carrying at their lower ends castors 23a on which are mounted rear wheels 13. Each angle member 28 also includes a forwardly extending, upwardly inclined arm 30 which intersects lower ends of arm portions 24, being secured thereto as at 31; arms 30 terminating at their forward ends in flattened portions 32 to provide means for engaging basket 16.

The angle members 28 in opposed relation are interconnected by a lower tie rod 33 extending between arms 29, and an upper tie rod 34 interconnecting arms 30 at points adjacent their juncture with arm portions 24 of frame means 14. A package carrier generally indicated at 35 and made up of longitudinally extending rods 36 may be disposed beneath basket 16, being mounted at the rear ends thereof on tie rod 33 and at their forward ends on cross member 22.

Basket 16 is made up of horizontally disposed, vertically spaced rods 37 interconnected by generally vertically disposed, spaced wires 38 welded together at their intersections in open work form and providing side walls 39 interconnected at their front ends by front wall 40; the wires 38 of said side and front walls being continued at their lower ends in a horizontal plane to provide a bottom wall 41 with said wires in intersecting openwork relation. Looped members 32a interconnect flattened arm portions 32 and the lowermost rod 37 to secure the basket 16 in place.

The rear ends of side walls 39 and bottom wall 41 are defined by a U shaped frame member in the form of a bent rod having parallel side portions 42 interconnected by a horizontal bottom portion 43; the rear ends of rods 37 of side walls 39 being welded to frame portions 42 and the rear ends of bottom wall 41 being welded to frame portion 43. Frame portions 42 lie adjacent arm portions 24 of frame means 14.

The swingable back wall member 17 of basket 16 is made up of a U shaped frame including parallel side arm portions 44 interconnected by a bottom horizontal portion 45. The arm portions 44 include loops 46 at their upper ends which extend about a transverse pivot rod 47 and are welded thereto. The pivot rod 47 is journalled for rotation in frame portions 25, end collars 48 being located on said rod between looped portions 46 and said frame portions.

Back wall member 17 further includes bent U shaped rod members 49, 50 in vertical, inverted position, and respectively long and short in length. Said members 49, 50 alternate in their disposition contacting bottom frame portion 45 and a cross rod 51 extending between side arm portions 44. Members 49, 50 are welded in place on frame portion 45 and rod 51, the upper portions of members 49 also being secured to pivot rod 47. The disposition of members 49, 50 is such as to provide a pair of laterally related spaced openings 52, for the purpose hereinafter appearing.

The support and back member 19 is made up of a rod bent into closed, rectangular frame form, including parallel side portions 53, a bottom portion 54 and a top portion 55. A cross rod 56 is welded at its opposite ends to side portions 53, rod 56 being located intermediate portions 54 and 55. Vertical, spaced rods 57 extend between top portion 55 and cross rod 56, to form a back for seat 18.

Member 19 is hingedly connected to back wall member 17 by means of looped, lower ends 58 of the outermost arms 49a of members 49, said looped ends 58 engaging bottom frame portion 54 of member 19, which lies adjacent bottom frame portion 45 of member 17.

Seat 18 is made up of a pair of longitudinally extending parallel rods 59 interconnected by parallel, transverse rods 60, 61. Rods 59 at their forward ends are formed with looped portions 62 hingedly engaging cross rod 56 on support member 19. A rectangular seat plate 63 is welded in place on rods 59, 60, 61.

Means is provided for guiding the movement of seat 18 as the same moves between its horizontal and collapsed positions. To this end, guide members 63 in looped form are located between the rear end portions of side walls 39 and frame portions 24, said members 63 being disposed in substantially vertical position and adapted to slidably receive therein lateral end portions 61a of rods 61 on seat 18.

Each guide member 63, formed of rod in bent form, comprises a terminal end portion 64 anchored in the upper end of frame portion 24, a bight portion 65 upwardly extending from end portion 64, a portion 66 extending downwardly from bight portion 65 and forwardly spaced from frame portion 24, a V shaped apex portion 67 at the lower end of portion 66 and a portion 68 extending upwardly from apex portion 67, said portion 68 lying in contact with frame portion 24. The upper ends of frame portions 42 are looped as at 69, said looped portions extending about the terminal end portions 64 of guide members 63; while contacting portions of frame portions 42 and guide member portions 68 are welded together.

With the support member 19 moved away from back wall member 17, as shown in Fig. 3, seat 18 will be in a substantially horizontal position and adapted to seat a child facing the handle 15, the legs of the child extending through openings 52 in back wall member 17. With the seat in such position, end portions 61a of the rear seat rod 61 are supported in the apex portions 67 of guide members 63', the front portion of seat 18 being hingedly supported on cross rod 56 of support member 19.

Figure 2:
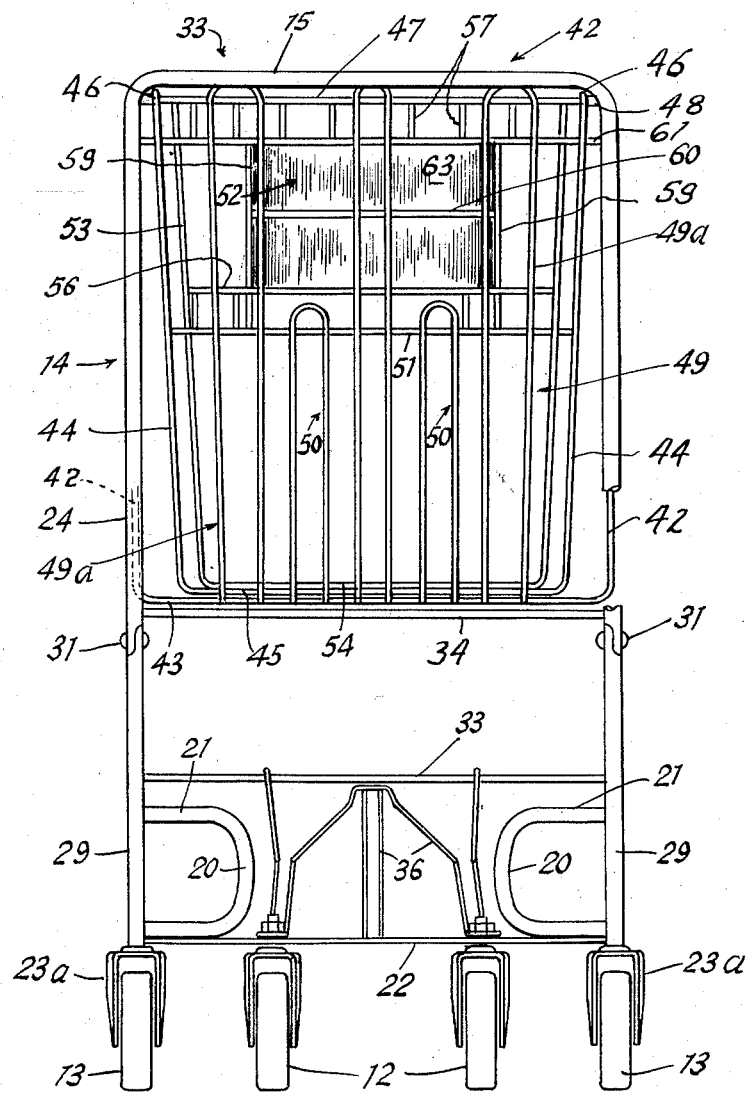
Fig. 2 is a rear end view thereof with the seat in its inoperative position.

When the child is removed from seat 18, and it is desired to nest cart 10 within a similar cart, said carts are moved relative to each other so that the front wall portion of the basket 16 of the one cart abuts the back wall member 17 of the other cart; continued movement of the one with respect to the other, causing the back wall member 17 of the forward cart to execute hinged movement toward front wall 40 in a clockwise direction, as shown in Fig. 2, by way of pivot rod 47.

The movement of back wall member 17 in turn will cause hinged movement of support member 19 towards the member 17, while seat 18 will move from its horizontal position, to a collapsed, vertical position, as indicated in Fig. 1, such movement being guided by the interengagement of rod portions 61a and guide members 63.

Furthermore, the upward, hinged movement of back wall member 17 and interconnected support member 19 will be limited to a substantially horizontal position by reason of stop means on guide members 63 in the form of bight portions 65 thereof; thus preventing the inadvertent, continued movement of said back wall member 17 towards handle 15, and injury to anyone using the cart.

Upon restoration of back wall member 17 to its normal, substantially vertical position, as when the nesting carts 10 are separated, back member 19 may be readily moved away from back wall member 17, thereby causing seat 18 to move in a guided manner from its collapsed position, to its substantially horizontal position, rod end portions 61a being directed along guide portions 68.

Undue lateral movement of seat rod 61 is prevented by means of short loop members 70 extending transversely of rod portions 61a and welded in place so as to span the guide members 63 at the inner sides thereof.

As various changes may be made in the embodiment of the invention herein shown without departing from the spirit thereof it is understood that all matter herein described shall be deemed illustrative and not limiting except as set forth in the appended claims.

I claim:

1. A grocery cart comprising a frame, an open top grocery container mounted on said frame, said container including side walls and a back wall hinged at the upper portions thereof on said frame for movement between the normal position thereof and a horizontal position thereof substantially level with the top edges of said side walls, a seat supporting member within said container in opposed relation to said back wall, said seat supporting member being pivotally connected at the lower end thereof to the lower end of said back wall for movement towards and away from said back wall, a collapsible seat pivotally mounted at one end thereof to said seat supporting member, guide means fixedly and immovably mounted on said frame, and means on the other end of said seat slidably engaged with said immovable guide means for guiding the movement of said seat between a substantially horizontal position thereof and a collapsed position thereof between said supporting means and said back wall upon relative pivoted movement between said supporting means and said back wall said guide means including stop means engageable by said seat means for supporting said seat in the horizontal position thereof.

2. A grocery cart as in claim 1 wherein said guide means comprises a pair of opposed, parallel looped members and said seat means comprises a pair of laterally extending projections respectively extending from opposite sides of said seat, said projections being respectively movable within said looped members.

3. A grocery cart as in claim 2 wherein said looped members include second stop means operative to limit the movement of said back wall to prevent the continued movement of said back wall beyond the second mentioned position thereof.

4. A grocery cart comprising a frame, a grocery receiving container mounted on said frame, a back wall member on said container, a seat supporting member, means connecting the lower ends of said members, whereby the upper end of said seat supporting member may be moved away from a central portion of said container to a position lying against said back wall member, a seat pivotally connected at one end thereof to said seat supporting member and having its other end slidably engaged with guide means immovably mounted on said frame, and stop means on said guide means engageable by said seat when it is disposed in a substantially horizontal position whereby said seat supporting member and said stop means will maintain said seat in said substantially horizontal position when the upper end of said seat supporting member is spaced from the upper end of said back wall member and movement of said seat support member towards said back wall member will cause said seat to be collapsed therebetween.

5. A grocery cart comprising a frame having parallel side portions and a handle portion connecting said side portions, a grocery receiving container mounted on said frame, a back wall on said container, a seat supporting member within said container, means pivotally interconnecting the lower ends of said back wall and seat supporting member whereby the upper end of said seat supporting member may be pivoted away from a central portion of said container into contact with said back wall, a seat pivotally connected at one of its ends to said seat supporting member, a pair of opposed, parallel guiding members respectively fixed to the parallel side portions of said frame adjacent the handle portion thereof, and means on opposite side portions of said seat at the other end thereof slidably carried by said guide members, and means on said guide means for limiting the movement of said seat to locate said seat in a substantially horizontal position upon movement of the upper portions of said seat supporting member and said back wall away form each other.

6. A grocery cart comprising a frame, a grocery receiving container on said frame, a back wall member on said container, a seat supporting member located inwardly of said back wall member, means pivotally connecting the lower ends of said members whereby they may have relative movement towards and away from each other, means pivotally mounting one of said members on said frame to permit said members to move towards each other and to conjointly move to a horizontal position, a seat pivotally mounted at one end thereof to said seat supporting member, vertically positioned, immovable means on side portions of said frame for slidably receiving lateral projections on the other end of said seat upon movement thereof between horizontal and collapsed positions thereof, said last mentioned means including stop means at the lower end thereof for holding said seat in the horizontal position thereof.

7. A grocery cart comprising a frame, a grocery receiving container on said frame, a pair of side walls and a back wall member on said container, means pivotally mounting the upper end of said member on said frame, a seat supporting member within said container and located forwardly of said back wall member, means pivotally connecting the bottom ends of said members to permit relative movement of said members toward and away from each other and conjoint movement relative to said frame, a seat between said members, means pivotally mounting one end of said seat on said seat supporting member at a point intermediate the upper and lower ends thereof, vertically disposed guide means fixedly and immovably disposed between the rear edges of the side walls of said container and opposed portions of said frame, means on the other end of said seat for slidably engaging said guide means whereby said seat may move relative to said frame towards and away from said back wall member, said guide means including stop means at the lower end thereof for limiting the downward movement of said seat upon movement of said seat supporting member away from said back wall member to locate said seat in a substantially horizontal position.

8. A cart as in claim 7 wherein said guide means includes stop means at the upper end thereof for limiting the conjoint movement of said members to a substantially horizontal position thereof with the interpivoted bottom ends thereof extending toward the front of said container.

9. A cart as in claim 7 wherein said guide means comprises a pair of parallel elongated, looped members respectively located on opposite sides of said container between rear end portions of said side walls and opposed portions of said frame.

10. A cart as in claim 9 wherein each looped member includes a forward portion secured to rear end portions of said side walls and a rearward portion fixed on said frame.

11. A movable rear wall portion for a nestable grocery cart comprising a back wall, a seat supporting wall located forwardly of said back wall, means pivotally connecting the lower ends of said walls so that the upper ends thereof may be moved towards and away from each other, means pivotally connecting the upper end of said back wall to said cart, whereby said walls may extend in a generally vertical direction but may be conjointly swung forwardly upwardly to a generally horizontal position, a seat located between said walls, said seat being pivotally connected at one edge to said seat supporting wall, means fixedly and immovably mounted on said cart for slidably receiving means on the opposite edge of said seat and including stop means for limiting the sliding movement of said seat to locate said seat in a substantially horizontal position in response to relative movement of said walls away from each other and upon relative movement of said walls toward each other to cause said seat to be collapsed therebetween.

12. A nestable cart comprising a container having a pair of fixed side walls on said cart and a back wall movable forwardly and upwardly between said side walls, means for pivotally mounting the upper end of said back wall on said cart, a collapsible seat within said container, support means hingedly connected at the lower end thereof to the lower end of said back wall, said support means being hingedly connected at a point above the lower end thereof to a forward edge of said seat, and vertically disposed guide means immovably mounted on rear edge portions of said side walls of the container for slidably receiving rear edge portions of said seat for movement towards and away from a horizontal position thereof, said guide means including stop means at the lower end thereof for maintaining said seat in the horizontal position.

13. A cart as in claim 12 wherein said guide means includes stop means at the upper end thereof for limiting the upward movement of said back wall.

14. A grocery cart comprising a frame, a container on said frame, said container comprising side walls and a back wall, said back wall pivotally mounted at the top edge thereof on said frame for movement between said side walls, a seat supporting member located between said side walls and forwardly of said back wall, said supporting member being hinged at its bottom edge to the bottom edge of said back wall, a seat pivotally connected at its forward edge to said seat supporting member at a point above the bottom edge thereof, vertically disposed means fixedly and immovably mounted on said frame adjacent the rear edges of said side walls and including stop means at the lower end thereof, and means on rear portions of said seat engageable with said stop means for supporting said seat in a horizontal position when said seat supporting member is moved forwardly and away from said back wall.

15. A cart as in claim 14 wherein said vertically disposed means includes stop means at the upper end thereof, the means on the rear portions of said seat being engageable with said last mentioned stop means upon movement of said seat supporting means toward said back wall and conjoint hinged movement of said seat, said seat supporting member and back wall being conjointly movable between said side walls towards a substantially horizontal position thereof, said last mentioned stop means limiting the conjoint movement of said seat supporting member and back wall to a substantially horizontal position thereof.

References Cited in the file of this patent

UNITED STATES PATENTS

| | | |
|---|---|---|
| 2,662,775 | Goldman | Dec. 15, 1953 |
| 2,769,645 | Young | Nov. 6, 1956 |
| 2,813,725 | Hoedinghaus et al. | Nov. 19, 1957 |